United States Patent
Ohashi et al.

(10) Patent No.: US 8,349,935 B2
(45) Date of Patent: Jan. 8, 2013

(54) POLYLACTIC ACID RESIN ARTICLE COMPRISING GRAINS OF METAL-HYDROXIDE PARTICLES

(75) Inventors: Akihiro Ohashi, Nagahama (JP); Kazuya Tanaka, Nagahama (JP); Yukio Kato, Hiratsuka (JP); Jun Takagi, Nagahama (JP); Shinichiro Yamada, Tokyo (JP); Hiroyuki Mori, Tokyo (JP); Yuko Fujihira, Tokyo (JP)

(73) Assignees: Mitsubishi Plastics, Inc., Tokyo (JP); Sony Corporation, Tokyo (JP)

( * ) Notice: Subject to any disclaimer, the term of this patent is extended or adjusted under 35 U.S.C. 154(b) by 452 days.

(21) Appl. No.: 10/551,872

(22) PCT Filed: Apr. 2, 2004

(86) PCT No.: PCT/JP2004/004856
§ 371 (c)(1),
(2), (4) Date: Sep. 30, 2005

(87) PCT Pub. No.: WO2004/090034
PCT Pub. Date: Oct. 21, 2004

(65) Prior Publication Data
US 2006/0194899 A1 Aug. 31, 2006

(30) Foreign Application Priority Data

Apr. 2, 2003 (JP) .................................. 2003-098736

(51) Int. Cl.
*C08K 3/22* (2006.01)
(52) U.S. Cl. ........ 524/430; 524/437; 524/539; 524/540; 524/599; 523/204; 523/205; 523/206; 428/403; 428/407; 106/18.26
(58) Field of Classification Search .......... 523/200–217; 524/430; 428/357–407
See application file for complete search history.

(56) References Cited

U.S. PATENT DOCUMENTS

| | | | | |
|---|---|---|---|---|
| 4,859,741 A * | 8/1989 | Takahashi et al. | ............. | 525/123 |
| 4,957,950 A * | 9/1990 | Staendeke et al. | ............. | 523/205 |
| 5,382,651 A * | 1/1995 | Kim et al. | ............. | 528/283 |
| 5,760,144 A * | 6/1998 | Ozeki et al. | ............. | 525/450 |
| 5,883,199 A * | 3/1999 | McCarthy et al. | ............. | 525/437 |
| 5,955,402 A * | 9/1999 | Hirata et al. | ............. | 508/106 |
| 5,969,009 A * | 10/1999 | Terada et al. | ............. | 523/526 |
| 6,673,463 B1 * | 1/2004 | Onishi et al. | ............. | 428/480 |
| 2001/0003761 A1 * | 6/2001 | Ishibashi et al. | ............. | 524/425 |
| 2002/0017734 A1 * | 2/2002 | Sugihara et al. | ............. | 264/51 |
| 2004/0034121 A1 * | 2/2004 | Nozaki et al. | ............. | 523/124 |
| 2005/0143502 A1 * | 6/2005 | Yamada et al. | ............. | 524/115 |
| 2006/0100313 A1 * | 5/2006 | Tanaka et al. | ............. | 523/205 |

FOREIGN PATENT DOCUMENTS

| | | |
|---|---|---|
| DE | 43 25 849 A1 | 2/1995 |
| EP | 0 949 305 A | 10/1999 |
| GB | 1 592 802 A | 7/1981 |
| JP | 08-252823 A | 10/1996 |
| JP | 09-208740 * | 8/1997 |
| JP | 09-278998 A | 10/1997 |
| JP | 2000-319532 A | 11/2000 |
| JP | 2002105298 A * | 4/2002 |
| WO | 2004/022650 * | 3/2004 |

OTHER PUBLICATIONS

H Sterzel, Polylactide with improved fire resistance contains metal oxide, hydrated metal oxide, phosphate or guanidinium salt as fire retardant, Feb. 2, 1995, Derwent English Abstract of DE-4325849 (Jul. 31, 1993).*
Machine Translation of JP2002-105298A. Translation performed on Feb. 4, 2008.*
Supplementary European Search Report for EP 04 72 5501 mailed Feb. 27, 2006.
Database WPI, Section Ch, Week 199826, Derwent Publications Ltd., London GB; Class A97, AN 1998-289751 XP002368107 & JP 10-98946 A (Shinetsu Polymer KK), Apr. 21, 1998.
Database WPI, Section Ch, Week 199649, Derwent Publications Ltd., London, GB; Class A23, AN 1996-492935 XP002368110 & JP 8-252823 A (Fujitsu Ltd), Oct. 1, 1996.
PCT International Preliminary Report on Patentability for PCT/JP2004/004856 issued Mar. 2, 2006.

* cited by examiner

*Primary Examiner* — Robert C Boyle
(74) *Attorney, Agent, or Firm* — Oblon, Spivak, McClelland, Maier & Neustadt, L.L.P.

(57) ABSTRACT

To obtain injection molded objects having biodegradability and excellent flame retardance and mechanical strength, the injection molded object includes a lactic acid based resin; and a metal hydroxide in a ratio of 5 to 40 mass parts per 100 mass parts of the lactic acid based resin. The metal hydroxide is surface-treated, and $Na_2O$ (w-$Na_2O$) present on a surface of grains of the metal hydroxide is 0.1 mass % or less based on the total mass of the metal hydroxide. Preferably, the injection molded object contains an aliphatic polyester other than the lactic acid based resin or an aromatic-aliphatic polyester in a ratio of 20 to 80 mass parts per 100 mass parts of the lactic acid based resin.

19 Claims, 1 Drawing Sheet

POLYLACTIC ACID RESIN ARTICLE
COMPRISING GRAINS OF
METAL-HYDROXIDE PARTICLES

CROSS-REFERENCE TO PRIOR APPLICATION

This is a U.S. National Phase application under 35 U.S.C. §371 of International Patent Application No. PCT/JP2004/004856 filed on Apr. 2, 2004. The International Application was published in Japanese on Oct. 21, 2004 as WO 2004/090034 A1 under PCT Article 21(2).

TECHNICAL FIELD

The present invention relates to an injection molded object that is biodegradable and flame retardant.

BACKGROUND ART

Conventional plastics are stable for a long period of time in natural environments and moreover have small bulk densities; problems have been pointed out that they renders shorter the service life of reclaimed lands for filling wastes there and damage natural view or life environments of wild animals and plants. Accordingly, materials that degrade and disappear with time in natural environments, thereby giving no adverse influences to the natural environments are called for. What has now attracted attention as such a material is a biodegradable resin. The biodegradable resins are known to be biodegraded in soil or water by hydrolysis or the action of microorganisms to finally produce harmless decomposed matter. It is also known that composted biodegradable resins can be readily disposed of.

Biodegradable resins that are going into practical application include aliphatic polyesters, modified PVA, cellulose ester compounds, modified starch, and blends of these. The aliphatic polyesters, which have a wide range of properties and processability close to that of general-purpose resins, have got into a wide use. For example, lactic acid based resins in combination with other aliphatic polyesters have excellent transparency, rigidity, heat resistance and so on and hence have attracted attention as a substitute material of, for example, polystyrenes and ABS resins in the field of injection molding such as appliance, OA devices and so on.

Materials used for appliance, OA devices and so on are required of flame retardance for preventing fire, and mainly halogene-based, particularly bromine-based flame retardants have been added to polystyrenes, ABS resins and soon. However, it is pointed out as the possibility that the halogen-based retardants generate noxious gases such as dioxine when they are burned. Accordingly, safety upon incineration of their wastes and thermal recycle is questioned. Phosphorus-based flame retardants have been developed to substitute for halogen-based flame retardants. There is the possibility that after the landfill operations, phosphorus is eluted from the wastes to contaminate soil and water; safety to humans and harmony with the environment is insufficient. Further, resins to which phosphorus-based flame retardants are added may be susceptible to adverse influences on practically important properties such as moldability, heat resistance and so on. To avoid the above-mentioned problems, flame retardants that contain neither halogen nor phosphorus have been under development. For example, metal hydroxides attract attention as having harmony with the environment, generating no noxious gases when they are disposed of.

However, when metal hydroxides are added to lactic acid based resins, degradation of the lactic acid based resins proceeds in the presence of water or the like, which causes a decrease in the molecular weight and mechanical strength of the lactic acid based resins and the like. To impart sufficient flame retardance to a resin, a large amount (for example, about 150 mass parts or more per 100 mass parts of resin) of a metal hydroxide must be added to the resin. With an increasing amount of the metal hydroxide used, the resin undergoes an increasing rate of a reduction in the mechanical strength thereof. Japanese Patent Application Laid-open No. Hei 8-252823 discloses addition of aluminum hydroxide or magnesium hydroxide to biodegradable plastics to impart flame retardance therewith. However, to obtain satisfactory flame retardance, it is necessary to add a large amount of, for example, magnesium hydroxide to the biodegradable plastics, resulting in a decrease in the mechanical strength of the plastics.

Japanese Patent Application Laid-open No. 2000-319532 discloses a flame retardant resin composition comprised by a resin and silicon oxide as a non-halogen-based and non-phosphorus-based flame retardant, which is made compatible with the resin. However, the resin composition does not have sufficient flame retarding performance, so that they find no use in appliance, OA devices and so on nor have sufficient mechanical properties.

DISCLOSURE OF THE INVENTION

Under the circumstances, the inventors of the present invention have made extensive studies and as a result have accomplished the present invention. It is an object of the present invention to provide an injection molded object having biodegradability as well as excellent flame retardance and excellent mechanical strength.

The injection-molded object of the present invention has a feature that it includes a lactic acid based resin and a metal hydroxide blended with the lactic acid based resin in a ratio of 5 to 40 mass parts per 100 mass parts of the lactic acid based resin, in which the metal hydroxide is surface-treated and $Na_2O$ (w-$Na_2O$) present on the surface of granules of the metal hydroxide is 0.1 mass % or less.

Here, the injection-molded object may further include an aliphatic polyester other than the lactic acid based resin or an aromatic-aliphatic polyester in a ratio of 20 to 80 mass parts per 100 mass parts of the lactic acid based resin.

Further, the injection-molded object may further include an inorganic filler in a ratio of 1 to 20 mass parts per 100 mass parts of the lactic acid based resin.

The metal hydroxide is preferably surface-treated by at least one coating selected from the group consisting of coating with a higher fatty acid, coating with a silane coupling agent, coating with a titanate coupling agent, coating with a nitrate, sol-gel coating, silicone polymer coating, and resin coating.

The injection molded object of the present invention is featured in that it includes a lactic acid based resin and a metal hydroxide blended with the lactic acid based resin in a ratio of 5 to 40 mass parts per 100 mass parts of the lactic acid based resin, in which the metal hydroxide is surface-treated and has a degradation rate of 10% or less and an impact resistance of 5 kJ/m² or more.

BEST MODE FOR CARRYING OUT THE INVENTION

Hereinafter, the present invention is explained in detail.

The injection molded object of the present invention is formed from a resin composition that includes a lactic acid based resin and a metal hydroxide blended with the lactic acid based resin in a ratio of 5 to 40 mass parts per 100 mass parts of the lactic acid based resin. The metal hydroxide, however, is surface-treated and $Na_2O$ (w-$Na_2O$) present on the surface of granules of the metal hydroxide is 0.1 mass % or less. When the amount of the metal hydroxide blended is less than 5 mass parts per 100 mass parts of the lactic acid based resin, the effect of imparting flame retardance is not obtained while when the amount of the metal hydroxide blended is larger than 40 mass parts, a reduction in molecular weight of the lactic acid based resin or the like and a decrease in mechanical strength of the molded object occur.

$Na_2O$ reacts with $H_2O$ as shown in the following formula to promote hydrolysis of the lactic acid based resin, an aliphatic polyester other than the lactic acid based resin, and an aromatic-aliphatic polyester.

When the hydrolysis of lactic acid based resin proceeds, the molecular weight of the lactic acid based resin is decreased and the mechanical strength of the molded object is decreased. Therefore, to blend the lactic acid based resin with an amount of metal hydroxide that is sufficient to impart the lactic acid based resin with flame retardance, the content of w-$Na_2O$ must be 0.1 mass % or less.

In the present specification, "w-$Na_2O$" means $Na_2O$ that is present on the surface of granules of the metal hydroxide.

In the present invention, the amount of w-$Na_2O$ is obtained by the following method. That is, first 5 g (weighed to a precision of the unit of 1 mg) of aluminum hydroxide was charged in a 100 ml-beaker and then 50 ml of water at a temperature of 50° C. to 60° C. was added thereto. The mixture was heated by keeping the temperature of the contents at 80° C. to 90° C. for 2 hours. Then, the contents was filtered with 5B filter paper and washed with 5 ml of water four times. The filtrates were cooled to 20° C. and then 10 ml of a 0.2 mg/ml Li internal standard solution and further distilled water was added thereto to make a total 100 ml. This was measured for Na amount by an atomic absorption photometer according to Japan Industrial Standard JIS H1901-1977. The obtained amount of Na is converted into the amount of $Na_2O$, and the converted value is used as the amount of w-$Na_2O$.

The injection molded object of the present invention realizes high flame retardance by containing a specified metal hydroxide. In the present invention, "flame retardance" means giving an effect of delaying the expansion of a burning part and an effect of preventing catch fire.

The metal hydroxides suitably used in the present invention include aluminum hydroxide, magnesium hydroxide, calcium aluminate hydrate, tin oxide hydrate, phlogopite, zinc nitrate hexahydrate, nickel nitrate hexahydrate and so on. Among these, it is preferable to use aluminum hydroxide or magnesium hydroxide from the viewpoint of cost and a flame retardance-improving function.

The surface-treating methods for the metal hydroxide include methods of coating the metal hydroxide with a higher fatty acid, a silane coupling agent, a titanate coupling agent, a nitrate and soon, a sol-gel coating method, a silicone polymer coating method, a resin coating method, and so on. The metal hydroxide used in the present invention is preferably surface-treated by one or more of these surface-treating methods. Since the amount of w-$Na_2O$ can be decreased by performing such a surface treatment to the metal hydroxide, the metal hydroxide blended in such an amount that sufficient flame retarding performance can be exhibited will decrease neither the molecular weight of the resin nor the mechanical strength of the molded object when the lactic acid based resin or the like and the metal hydroxide are kneaded together.

In the present invention, it is preferable to further blend the resin composition with a flame retardant aid. The flame retardant aid blended further can improve the flame retardance of the molded object.

Specific examples of the flame retardant aid include metal compounds such as boric anhydride, zinc stannate, zinc borate, iron nitrate, copper nitrate, zinc nitrate, nickel nitrate, ammonium nitrate, and metal sulfonate; phosphorus compounds such as red phosphorus, high molecular phosphate esters, phosphazene compounds; nitrogen compounds such as melamine, melamine cyanurate, melem, and mellon; polyethylene naphthalate (PAN); silicone compounds, and soon. Among these, it is preferable in consideration of influences on the environment to use melamine cyanurate, zinc nitrate, nickel nitrate, or zinc borate.

The lactic acid based resins used in the present invention include poly(L-lactic acid) whose structural unit is L-lactic acid, poly(D-lactic acid) whose structural unit is D-lactic acid, poly(DL-lactic acid) whose structural units are L-lactic acid and D-lactic acid, and mixtures thereof. The compositional ratio of the D-form and L-form of the lactic acid based resin is preferably L-form:D-form=100:0 to 90:10, or L-form:D-form=0:100 to 10:90; more preferably L-form:D-form=100:0 to 94:6, or L-form:D-form=0:100 to 6:94. When the compositional ratio of L-from and D-form is outside the above-mentioned ranges, it is difficult for the molded object to have acceptable heat resistance and their use may be limited. Of course, lactic acid based resins with different copolymerization ratios of the L-form and D-form may also be blended. In this case, it is only needed to adjust an average of the copolymerization ratios of L-form and D-form of a plurality of lactic acid based resins to be within the above-mentioned ranges.

Polymerization methods for lactic acid based resins that can be adopted include known methods such as a condensation polymerization method and a ring opening polymerization method. For example, in the case of the condensation polymerization method, L-lactic acid or D-lactic acid or a mixture of these is directly subjected to condensation polymerization with dehydration to obtain a lactic acid based resin having any desired composition.

In the case of ring opening polymerization method, a lactic acid based resin can be synthesized from a lactide which is a cyclic dimer of lactic acid by selecting a suitable catalyst and using a modifier as necessary.

The lactides include L-lactide, which is a dimer of L-lactic acid, D-lactide, which is a dimer of D-lactic acid, and DL-lactide, which consists of L-lactic acid and D-lactic acid. These can be mixed as necessary and polymerized to obtain a lactic acid based resin having any desired composition and crystallinity.

Further, according to the necessity of increasing the heat resistance, a small amount of copolymerizable component can be added. For example, a nonaliphatic dicarboxylic acid such as terephthalic acid and/or a non-aliphatic diol such as an ethylene oxide adduct of bisphenol A can also be used.

Furthermore, with a view to increasing the molecular weight of the polymer, a small amount of a chain extender, for example, a diisocyanate compound, an epoxy compound, and an acid anhydride can also be used.

Further, the lactic acid based resin may be a copolymer of lactic acid and/or other hydroxycarboxylic acid unit such as α-hydroxycarboxylic acid other than lactic acid or copolymer with an aliphatic diol and/or an aliphatic dicarboxylic acid.

Other hydroxycarboxylic acid units include bifunctional aliphatic hydroxycarboxylic acids such as optical isomers of lactic acid (D-lactic acid for L-lactic acid; and L-lactic acid for D-lactic acid), glycolic aid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methyllactic acid, and 2-hydroxycaproic acid; and lactones such as caprolactone, butyrolactone, and valerolactone.

The aliphatic diols that are copolymerized with the lactic acid based resin include ethylene glycol, 1,4-butanediol, 1,4-cyclohexane dimethanol and so on.

The aliphatic dicarboxylic acids include succinic acid, adipic acid, suberic acid, sebacic acid, and dodecanedioic acid.

The lactic acid based resin used in the present invention has a weight average molecular weight within the range of, preferably 50,000 to 400,000, more preferably 100,000 to 250,000. When the weight average molecular weight of the lactic acid based resin is smaller than 50,000, practical physical properties such as mechanical properties and heat resistance of the resin can hardly be exhibited. On the other hand, when the weight average molecular weight of the lactic acid based resin is larger than 400,000, the lactic acid based resin has melt viscosity too high to provide acceptable molding processability.

The lactic acid based resins that can be preferably used in the present invention include "LACTY" series resins manufactured by Shimadzu Corporation, "LACEA" series resins manufactured by Mitsui Chemical, "NATURE WORKS" series resins manufactured by Cargill Dow, and so on.

In the present invention, to improve impact resistance of the molded object, an aliphatic polyester other than the lactic acid based resin, or an aromatic-aliphatic polyester can be blended. It is preferable that the aliphatic polyester and the aromatic-aliphatic polyester have a heat of crystal melting (ΔHm) of less than 30 J/g. When ΔHm is less than 30 J/g, it does not occur that a crystal portion increases and a rubber portion decreases accordingly. Therefore, the problem does not occur that no impact absorbing effect can be obtained. The amount of the aliphatic polyester other than the lactic acid based resin or the aromatic-aliphatic polyester to be blended is preferably within the range of 20 to 80 mass parts per 100 mass parts of the lactic acid based resin. When the amount of the aliphatic polyester other than the lactic acid based resin or the aromatic-aliphatic polyester to be blended is within the range of 20 to 80 mass parts per 100 mass parts of the lactic acid based resin, the effect of improving impact resistance can be obtained, and the molded object is not softened excessively, so that there occurs no problem either at the time of heat treatment or at the practical use.

Examples of the aliphatic polyesters other than the lactic acid based resin include aliphatic polyesters obtained by condensation polymerization of an aliphatic diol and an aliphatic dicarboxylic acid, the aliphatic polyester obtained by ring opening polymerization of a cyclic lactones, the synthetic aliphatic polyester and so like.

The aliphatic diols include ethylene glycol, 1,4-butanediol, 1,4-cyclohexane dimethanol and so on. The aliphatic dicarboxylic acids include succinic acid, adipic acid, suberic acid, sebacic acid, dodecanedioic acid and so on. The aliphatic polyesters obtained by condensation polymerization between an aliphatic diol and an aliphatic dicarboxylic acid include those obtained by condensation polymerization between at least one compound selected from the aliphatic diols and at least one compound selected from the aliphatic dicarboxylic acids. As necessary, the molecular weight of the resin can be jumped up with, for example, isocyanate compounds to obtain polymers having any desired molecular weight. Examples of the aliphatic polyesters obtained by condensation polymerization between an aliphatic diol and an aliphatic dicarboxylic acid include "BIONOLE" series resins manufactured by Showa Highpolymer Co., Ltd., "ENPOLE" series resins manufactured by Ire Chemical and so on, which are commercially available.

Aliphatic polyesters obtained by ring opening polymerization of cyclic lactones include those obtained by selecting at least one compound from cyclic monomers such as ε-caprolactone, δ-valerolactone, and β-methyl-δ-valerolactone, followed by polymerization. For example, "CELL GREEN" series resins manufactured by Daicel Chemical Industry can be mentioned of as a commercially available example.

The synthetic aliphatic polyesters include, for example, copolymers of cyclic acid anhydrides and oxiranes, more particularly, succinican hydride and ethylene oxide, propylene oxide, or the like.

The aromatic-aliphatic polyesters include those aromatic-aliphatic polyesters having biodegradability obtained by condensation polymerization of an aromatic dicarboxylic acid component, an aliphatic dicarboxylic acid component, and an aliphatic diol component.

Examples of the aromatic dicarboxylic acid component include isophthalic acid, terephthalic acid, and 2,6-naphthalenedicarboxylic acid, or the like. Examples of the aliphatic dicarboxylic acid component include succinic acid, adipic acid, suberic acid, sebacic acid, and dodecanedioic acid, or the like. The aliphatic diols include, for example, ethylene glycol, 1,4-butanediol, and 1,4-cyclohexane dimethanol. Two or more each of the aromatic dicarboxylic acid component, the aliphatic dicarboxylic acid component, and the aliphatic diol component can be used.

The aromatic dicarboxylic acid component that is most suitably used in the present invention is terephthalic acid; the aliphatic dicarboxylic acid component that is most suitably used is adipic acid; the aliphatic diol component that is most suitably used is 1,4-butanediol.

Although the aliphatic polyesters comprised by the aliphatic dicarboxylic acid and aliphatic diol are known to have biodegradability, it is necessary that an aliphatic chain is present between the aromatic rings so as to exhibit biodegradability in the aromatic-aliphatic polyesters. For this purpose, the ratio of the aromatic dicarboxylic acid component is preferably 50 mol % or less.

Representative examples of the aromatic-aliphatic polyesters include copolymers of polybutylene adipate and terephthalate, copolymers of tetramethylene adipate and terephthalate. "ECOFLEX" manufactured by BASF is a commercially available example of the copolymer of polybutylene adipate and terephthalate. "EASTAR BIO" manufactured by Eastman Chemicals is a commercially available example of the copolymer of tetramethylene adipate and terephthalate.

In the present invention, the resin composition may further include an inorganic filler. By blending the inorganic filler, shrinking of the molded object upon heating or due to a change with time can be suppressed, thereby increasing the dimension stability of the molded object. When the inorganic filler is blended with the resin composition, the amount of the inorganic filler to be blended is preferably within 1 to 20 mass parts, more preferably 5 to 15 mass parts, per 100 mass parts of the lactic acid based resin. When the content of the inorganic filler is less than 1 mass part, it is difficult to suppress shrinkage upon heating or due to a change with time, so that the dimension stability of the molded object cannot be improved. On the other hand, when the content of the inorganic filler is larger than 20 mass parts, the mechanical strength of the molded object cannot be maintained.

Specific examples of the inorganic filler that can be used in the present invention include talc, kaolin, calcium carbonate, bentonite, mica, sericite, glass flake, graphite, antimony trioxide, barium sulfate, zinc borate, hydrated calcium borate, iron nitrate, copper nitrate, zinc nitrate, nickel nitrate, alumina, magnesia, Wollastonite, Xonotolite, sepiolite, whisker, glass fiber, metal powder, beads, silica balloon, and sirasu (volcanic sand) balloon, or the like. Treatment of the surface of the inorganic filler with a titanic acid, a fatty acid, a silane coupling agent or the like improves the adhesion of the inorganic filler with the resin, thereby improving the effect given by the inorganic filler.

In the present invention, to impart the biodegradable resins, such as lactic acid based resins with resistance to hydrolysis, a carbodiimide compound can be added to the resin composition. The carbodiimide compounds that can be used include those compounds having a basic structure represented by the following general formula (1):

$$-(N=C=N-R-)_n- \qquad (1)$$

wherein R represents an aliphatic group, an alicyclic group, or an aromatic group; n is an integer of 1 or more, usually determined as appropriate between 1 to 50.

Specific examples thereof include bis(propylphenyl)carbodiimide, poly(4,4'-diphenylmethanecarbodiimide), poly(p-phenylenecarbodiimide), poly(m-phenylenecarbodiimide), poly(tollylcarbodiimide), poly(diisopropylphenylenecarbodiimide), poly(methyldiisopropylphenylenecarbodiimide), and poly(triisopropylphenylenecarbodiimide) or the like, and monomers of these. In the present invention, these carbodiimide compounds can be used singly or as combinations of two or more of them.

It is preferable that the carbodiimide compound be added to the resin composition within the range of 0.5 to 10 mass parts per 100 mass parts of the resin composition that constitute the injection molded object. When the content of the carbodiimide compound is below the above-mentioned range, the effect of resistance to hydrolysis may not be exhibited. On the other hand, when the content of the carbodiimide compound exceeds the above-mentioned range, bleeding out of the carbodiimide compound may occur, so that appearance failure of the molded object or a decrease in mechanical properties due to plasticization may occur. In addition, biodegradability or compost decomposability may be lost.

Within the ranges in which the effects of the present invention are not damaged, additives such as heat stabilizers, antioxidants, UV absorbents, photostabilizers, pigments, colorants, lubricants, nucleating agents, and plasticizers may be added.

Now, the molding method for producing injection molded objects of the present invention is explained.

The injection molded objects of the present invention can be obtained by performing injection molding by charging each raw material of a lactic acid based resin, a metal hydroxide, and optionally an aliphatic polyester other than the lactic acid based resin, an aromatic-aliphatic polyester, an inorganic filler, and additives in the same injection molding machine, directly mixing and injection molding the resultant. Alternatively, dry-blended raw materials are extruded into strands using a twin-screw extruder to fabricate pellets in advance and again the injection molding machine is used to obtain an injection molded article from the pellets.

In both the methods, a decrease in molecular weight due to degradation of the raw materials must be taken into consideration. To uniformly mix the respective raw materials, it is preferable to choose the latter method.

Specifically, for example, a lactic acid based resin, a metal hydroxide and so on are sufficiently dried to remove moisture, and then melt mixed using a twin-screw extruder are extruded into strands to fabricate pellets. In this case, it is preferable that the melt extrusion temperature be selected appropriately taking into consideration that the lactic acid based resin undergoes a change in melting point depending on the compositional ratio of the L-lactic acid structure to the D-lactic acid structure, and that when an aliphatic polyester other than the lactic acid based resin, an aromatic-aliphatic polyester and so on are mixed, the melting point of the mixed resin will change depending on the mixing ratios thereof. Usually, the melt extrusion temperature is selected within the range of 100° C. to 250° C.

The fabricated pellets are fully dried to remove the moisture there from and then injection molded using an injection molding method that is generally adopted, for example, when thermoplastic resins are molded. For example, injection molded articles can be obtained by injection molding methods such as a gas-assisted molding method and an injection compression molding method. In addition, depending on the purposes, methods other than those described above, such as an in-mold molding method, a gas press molding method, a two color molding method, a sandwich molding method, PUSH-PULL, and SCORIM, can be adopted. However, the injection molding method that can be used in the present invention is not limited thereto.

The injection molding apparatus that can be used in the present invention includes a generally used injection molding machine, a gas-assisted molding machine and an injection compression molding machine and so on and molds used for these injection molding machines and accessory devices, mold temperature controlling apparatus, material drying apparatus and so on.

Preferably, molding conditions are set so as to avoid thermal degradation of the resin in the injection cylinder such that molding is performed at a molten resin temperature within the range of 170° C. to 210° C.

In the case where the injection molded articles are to be obtained in an amorphous state, the temperature of the mold is preferably as low as possible in order to shorten a cooling time in the molding cycle (mold closure—injection pressure maintenance—cooling—mold opening—taking out). It is preferably that the temperature of the mold is generally 15° C. to 55° C. It is also desirable to use a chiller. However, to suppress, for example, shrinkage, curl, and deformation of the molded article during post-crystallization, it is preferable to set the temperature of the mold to a low-temperature side in the range of 15° C. to 55° C. For example, it is preferable to set the temperature of the mold at 15° C. to 30° C.

In the case of molded articles that contain an inorganic filler, the more the amount of the inorganic filler contained, the more frequently flow marks occur on the surface of the molded article. Accordingly, it is preferable that the injection speed be set lower than that of the case where the molded article contains no inorganic filler. Specifically, for example, assuming that a lactic acid based resin containing 15 mass % of talc and other necessary components are injection molded using an injection molding machine with a screw diameter of 25 mm provided with a plate mold of 2 mm thick, if the injection speed is 30 mm/second or less, injection molded articles free of flow marks can be obtained. On the other hand, when the lactic acid based resin composition contains no inorganic filler, no flow marks occur even at an injection speed of 50 mm/second.

When sink marks tend to occur, it is preferable that a sufficient retention pressure and a sufficient retention time be set. For example, it is preferably that the retention pressure be set in the range of 30 MPa to 100 MPa while the retention time is set appropriately within the range of, preferably 1 second to 15 seconds depending on the shape and thickness of the molded product to be obtained. For example, when the molding is performed using an injection molding machine equipped with a 2 mm-thick plate mold, the retention time is around 3 seconds.

In the present invention, it is preferable that the molded article obtained by injection molding be subjected to heat treatment to crystallize it. Crystallization of the molded article in this manner leads to further improvement of the heat resistance of the molded article. The temperature of the heat treatment in the range of, preferably 60° C. to 130° C., more preferably 70° C. to 90° C. When the temperature of the heat treatment is lower than 60° C., the crystallization of the molded article does not proceed while the temperature of the heat treatment is higher than 130° C., the molded article is deformed or shrunk when it is cooled after the molding.

The time of the heat treatment is set appropriately depending on the composition of the material, the heat treating apparatus, and the temperature of the heat treatment. For example, when the temperature of the heat treatment is 70° C., it is preferable to perform the heat treatment for 15 minutes to 5 hours. Further, when the temperature of the heat treatment is 130° C., it is preferable to perform the heat treatment for 10 seconds to 30 minutes. Methods by which the molded article is crystallized include a method that implies increasing the temperature of the mold after the injection molding to cause crystallization in the mold, a method that implies crystallization by using hot air, steam, warm water, a far infrared ray heater, an IH heater or the like after taking the injection molded article in an amorphous state out of the mold, and so on. At the time of heat treatment, the injection molded article does not have to be fixed. However, to prevent deformation of the molded article, it is preferable to fix the molded article by using a mold or a resin mold. Also, taking productivity into consideration, it is preferable that the molded articles be heat treated in a wrapped state.

For example, where the crystallization is allowed to proceed in the mold, molten resin is filled into the mold heated and held in the mold for a predetermined time. The mold temperature is preferably 60° C. to 130° C., more preferably 90° C. to 110° C. If the mold temperature is lower than 60° C., crystallization takes a long time to make the cycle too long. On the other hand, if the mold temperature is higher than 130° C., deformation may occur when the molded product is released from the mold.

Since the injection molded objects of the present invention has excellent flame retardance, they can be advantageously used as appliance, OA devices, and other general molded products. In addition, the injection molded objects of the present invention can be biodegraded in soil and the like, so they are environment friendly molded products.

Figure 1A:
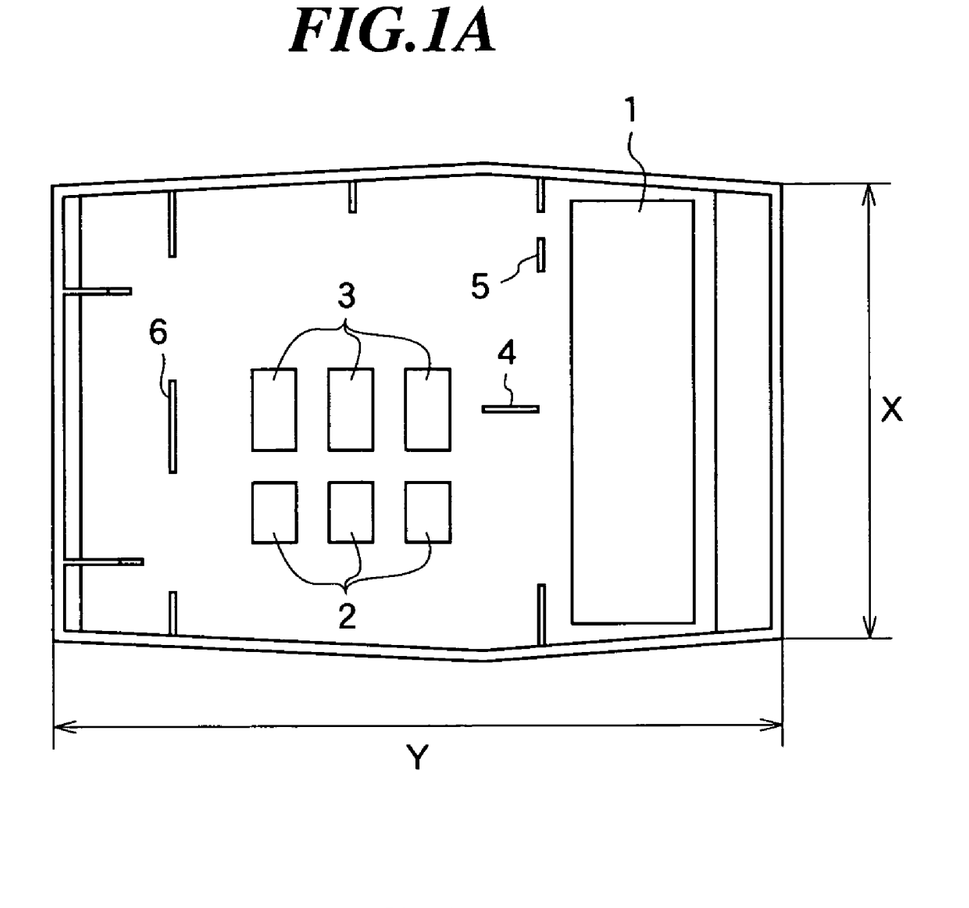
FIG. 1A is a plan view showing an injection molded object according to a first embodiment of the present invention.
Figure 1B:
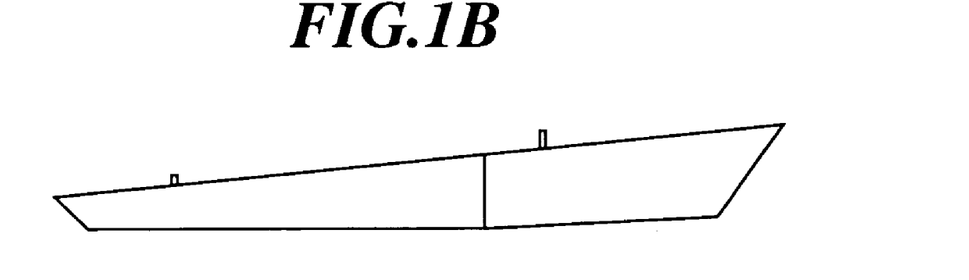
FIG. 1B is a front view of the injection molded object shown in FIG. 1A.

As an example of the embodiment of the present invention, a table calculator-shaped molded product is shown in FIG. 1A and FIG. 1B. FIG. 1A is a plan view showing the table calculator-shaped molded product of the present invention and FIG. 1B is a front elevational view of the molded product shown in FIG. 1A. In FIGS. 1A and 1B, reference numerals 1 to 6 designate openings of through holes or slots. 1 designates a portion corresponding to a window that displays calculation results. 2 and 3 designate portions that correspond to key portions representing numeric characters. 4, 5, and 6 designate portions where claw is engaged.

EMBODIMENTS

Hereinafter, the present invention will be described in more detail by referring to examples. However, the present invention should not be considered to be limited thereto and various modifications and variations can be made within the technical scope of the present invention. In the examples, various measured values were obtained by performing measurements under the following conditions and calculation of the measured values.

(1) Flame Retardance

Flame tests were performed according to safety standards UL94V of Underwriter Laboratories. A set of five test strips each having a length of (125±5) mm×a width of (13±0.5) mm×a thickness of (3±0.5) mm were used. The evaluation of flammability of the test strips was made based on the following criteria. Here, t1 indicates an afterflame time after a first contact with flame; t2 indicates an afterflame time after a second contact with flame; and t3 indicates an after-ember time after the second contact with flame. The term "afterflame" means a time in which a test strip continues to burn with flame after the ignition source was removed. The term "after-ember time" means a time in which a test strip continues to glow after the ignition source was removed and/or burning with flame ceased. Symbols "○" and "Δ" indicate that the samples concerned satisfy practical standards.

TABLE 1

| Criteria of Judgment | | | |
|---|---|---|---|
| Judgment | ○ | Δ | X |
| Afterflame time of test piece, t1 or t2 | ≦10 Seconds | ≦30 Seconds | At least one dissatisfying practical standards |
| Sum of afterflame times for each group (sum of afterflame times for 5 test strips in each group t1 + t2) | ≦50 Seconds | ≦250 Seconds | |
| Sum of afterflame time and after-ember time for each test strip after second contact with flame, t2 + t3 | ≦30 Seconds | ≦60 Seconds | |
| Afterflame or after-ember up to the holding clamp | None | None | |

(2) Degradability

A weight average molecular weight (Mw) of a lactic acid based resin before kneading with a metal hydroxide, and a weight average molecular weight (Mw) of the lactic acid based resin after injection molding were measured and a degradation ratio (%) was calculated according to the following formula. When the degradation ratio is 10% or less, the sample is judged to satisfy the practical standards.

$$\text{Degradation ratio (\%)} = \frac{(Mw \text{ before kneading}) - (Mw \text{ after injection molding})}{(Mw \text{ before kneading})} \times 100$$

Measurement of the weight average molecular weight (Mw) of the lactic acid based resin was performed by gel permeation chromatography using chloroform as a solvent at a solution concentration of 0.2 wt/vol %, an injection amount of solution of 200 μl, a solvent flow rate of 1.0 ml/minute, and a solvent temperature of 40° C. and the weight average molecular weight of the lactic acid based resin was calculated in terms of polystyrene. The weight average molecular weights of the standard polystyrenes used were 2,000,000, 430,000, 110,000, 35,000, 10,000, 4,000, and 600.

(3) Impact resistance

According to Japan Industrial Standards JIS K-7110, No. 1A test strips (a length of 64 mm×a width of 12.7 mm×a thickness of 4 mm) were prepared and Izod impact strength at 23° C. of the test pieces was measured using an impact tester ("JISL-D", manufactured by Toyo Seiki Seisakusho Co., Ltd.). Izod impact strength of 5 kJ/cm$^2$ or more was used as a practical standard.

(4) Heat resistance

According to Japan Industrial Standards JIS K-7191, test pieces (a length of 120 mm×a width of 11 mm×a thickness of 3 mm) were prepared. Deflection temperature under load of the test strips was measured using a deflection temperature under load tester ("S-3M", manufactured by Toyo Seiki Seisakusho Co., Ltd.). Measurement was performed under conditions of edgewise direction and deflection stress of 1.80 MPa on the test strips. Deflection temperature under load of 50° C. or higher was used as practical standard.

(5) Dimension Stability

Using an injection molding machine "IS50E" manufactured by Toshiba Machine Co., Ltd., table calculator-shaped amorphous molded articles having the configuration shown in FIG. 1 (X=about 7.6 cm, Y=about 12.2 cm). The molding condition used were a cylinder temperature of 195° C., a mold temperature of 25° C., an injection pressure of 110 MPa, an injection time of 1.5 seconds, a retention pressure of 80 MPa, a retention time of 3.0 seconds, a backing pressure of 10 MPa, and a screw rotation number of 110 rpm.

After the molding, the molded articles were left to stand in a measuring chamber (temperature: 23° C., relative humidity: 50%) for 24 hours, and then sizes X and Y shown in FIG. 1 were measured. Thereafter, the molded articles were heat-treated (annealed) at a temperature of 70° C. for 3.5 hours. The annealing was performed using a thermo-hygrostat oven in a state where the molded articles were left to stand without load. Immediately after the annealing, the molded articles were taken out of the oven and left to stand in the measuring chamber for 24 hours. Thereafter, the sizes X and Y were again measured and shrinking ratios due to the annealing were calculated. In the measurement of the sizes X and Y, a three-dimensional measuring machine was used. Evaluation was made based on the following standards. Symbols "○" and "Δ" indicate that the samples satisfied the practical standards.

Evaluation Standards:

"○": Both the shrinking ratios of X and Y were less than 1.0%;

"Δ": Either one of the shrinking ratios X and Y was 1.0% or more, or both the shrinking ratios X and Y were 1.0% or more and less than 2.0%; and "X": both the shrinking ratios of X and Y were 2.0% or more.

(6) Measurement of Metal Hydroxide, w-Na$_2$O 5 g of aluminum hydroxide (weighed to a precision of the unit of 1 mg) was charged in a 100 ml-beaker and then 50 ml of water at a temperature of 50° C. to 60° C. was added thereto. The mixture was heated by keeping the temperature of the contents at 80° C. to 90° C. for 2 hours. Then, the contents was filtered with 5B filter paper and washed with 5 ml of water of the temperature at 50° C. to 60° C. four times. The filtrates were cooled to 20° C. and then 10 ml of a 0.2 mg/ml Li internal standard solution and further distilled water was added thereto to make a total 100 ml. This was measured for Na amount by an atomic absorption photometer according to Japan Industrial Standard JIS H1901-1977. The obtained amount of Na was converted into the amount of Na$_2$O, and the converted value was used as the amount of w-Na$_2$O. The w-Na$_2$O=0.05 means that the content of the converted value is 0.05 mass % of the metal hydroxide.

(7) Measurement of Moisture Percentage

About 0.5 g (weighed to a precision of the unit of 0.1 mg) of a sample as a target for measurement was measured for moisture content at 180° C. using a Karl-Fischer moisture meter ("MKC-510N", manufactured by Kyoto Electronics Manufacturing Co., Ltd.) and moisture percentages were calculated.

Example 1

"Nature Works 6000D" (L-lactic acid/D-lactic acid=95.8/4.2, having a weight average molecular weight of 160,000) manufactured by Cargill Dow as a lactic acid based resin, "Pyrolyzer HG" (aluminumhydroxide surface-treated with stearic acid, silane coupling agent, and ammonium nitrate; w-Na$_2$O=0.05) manufactured by Ishizuka Glass Co., Ltd. as a metal hydroxide were used. After "Nature Works 6000D" and "Pyrolyzer HG" were dry-blended in a mass ratio of 100:25, the mixture was dried at 60° C. for 12 hours using a vacuum drier. The obtained mixture was measured for moisture content at 180° C. using a Karl-Fischer moisture meter and found to confirm that it had a moisture content of 0.5% or less. Then, the mixture was compounded into pellets using a small 40-mmφ unidirectional-flow twin-screw extruder manufactured by Mitsubishi Heavy Industries, Ltd. The obtained pellets were dried at 60° C. for 12 hours using a vacuum drier. The moisture content of the dried pellets was measured at 180° C. using the Karl-Fischer moisture meter to confirm that the pellets had a moisture percentage of 0.5% or less. The pellets thus obtained were charged in an injection molding machine "IS50E" manufactured by Toshiba Machine Co., Ltd., and plates of L 100 mm×W 100 mm×t 4 mm were injection molded. Main molding conditions were as follows.

1) Temperature conditions: Cylinder temperature (195° C.), mold temperature (20° C.);
2) Injection conditions: Injection pressure (115 MPa), retention pressure (55 MPa); and
3) Metering conditions: Screw rotation number (65 rpm), backing pressure (15 MPa).

Then, the injection molded articles (plates) were left to stand in a baking tester ("DKS-5S", manufactured by Daiei Kagaku Seiki Mfg. Co., Ltd.) and heat-treated at 70° C. for 3.5 hours. The plates thus treated were evaluated for flame retardance, degradability, impact resistance, and heat resistance. Table 2 shows the results obtained.

Example 2

Injection molded articles were obtained in the same manner as that in Example 1 except that in Example 1, "BW103ST" (aluminum hydroxide surface-treated with a silane coupling agent, w-Na$_2$O=0.05) manufactured by Nippon Light Metal Co., Ltd. was used as the metal hydroxide, and a ratio of the contents of "Nature Works 6000D" and "BW103ST" was set to 100:10 by mass.

The injection molded articles thus obtained were evaluated in the same manner as that in Example 1. Table 2 shows the results obtained.

Example 3

Injection molded articles were prepared in the same manner as that in Example 2 except that the ratio of the contents of "Nature Works 6000D" and "BW103ST" was changed to 100:25 by mass.

The injection molded articles thus obtained were evaluated in the same manner as that in Example 1. Table 2 shows the results obtained.

Example 4

Injection molded articles were prepared in the same manner as that in Example 2 except that the ratio of the contents of "Nature Works 6000D" and "BW103ST" was changed to 100:40 by mass.

The injection molded articles thus obtained were evaluated in the same manner as that in Example 1. Table 2 shows the results obtained.

Example 5

Injection molded articles were prepared in the same manner as that in Example 1 except that the kind of the metal hydroxide was changed to "Kisuma 5A" (magnesium hydroxide surface-treated with a higher fatty acid, w-$Na_2O$=0.001) manufactured by Kyowa Chemical Industry Co., Ltd.

The injection molded articles thus obtained were evaluated in the same manner as that in Example 1. Table 2 shows the results obtained.

Example 6

Injection molded articles were obtained in the same manner as that in Example 4 except that in Example 4, an aromatic polyester "Ecoflex" (24 mo % terephthalic acid, 26 mol % adipic acid, 50 mol % 1,4-butanediol; heat of crystal melting (ΔHm)=20 J/g) manufactured by BASF was also used as the resin in a ratio of 20 mass parts per 100 mass parts of the lactic acid based resin. That is, a ratio of the contents of "NatureWorks 6000D", "Ecoflex" and "BW103ST" was 100:20:40 by mass.

The injection molded articles thus obtained were evaluated in the same manner as that in Example 1. Table 2 shows the results obtained.

Example 7

Injection molded articles were obtained in the same manner as that in Example 6 except that in Example 6, talc "SG-95" manufactured by Nippon Talc Co., Ltd. was used as an inorganic filler. That is, a ratio of the contents of "Nature Works 6000D", "Ecoflex", "SG-95", and "BW103ST" was 100:20:10:40 by mass.

The injection molded articles thus obtained were evaluated in the same manner as that in Example 1. Table 2 shows the results obtained.

TABLE 2

| Composition (mass part) | | Example 1 | Example 2 | Example 3 | Example 4 | Example 5 | Example 6 | Example 7 |
|---|---|---|---|---|---|---|---|---|
| Resin | Nature Works 6000D | 100 | 100 | 100 | 100 | 100 | 100 | 100 |
| | Ecoflex (ΔHm = 20 J/g) | | | | | | 20 | 20 |
| | Bionole 1003 (ΔHm = 40 J/g) | | | | | | | |
| Inorganic filler | SG-95 | | | | | | | 10 |
| Metal hydroxide | Pyrolyzer HG (Stearic acid, silane coupling agent, nitrate-treated; w-$Na_2O$ = 0.05) | 25 | | | | | | |
| | BW103ST (Silane coupling agent-treated; w-$Na_2O$ = 0.05) | | 10 | 25 | 40 | | 40 | 40 |
| | Kisuma 5A (Higher fatty acid-treated; w-$Na_2O$ = 0.001) | | | | | 25 | | |
| | B103 (No treatment, w-$Na_2O$ = 0.2) | | | | | | | |
| | H-43S (Stearic acid-treatment, w-$Na_2O$ = 0.13) | | | | | | | |
| Evaluation | Flame retardance (UL94) | ○ | ○ | ○ | ○ | ○ | ○ | ○ |
| | Degradation rate (%) | 2 | 1 | 3 | 3 | 6 | 3 | 4 |
| | Izod impact strength (kJ/$m^2$) | 7 | 8 | 6 | 6 | 6 | 15 | 12 |
| | Deflection temperature under load (° C.) | 68 | 67 | 68 | 69 | 68 | 60 | 62 |

As will be apparent from Table 2, the injection molded articles of Examples 1 to 7 showed "○" for the evaluation of flame retardance, and the degradation ratio is 10% or less, and had an Izod impact strength of 5 kJ/$m^2$ or more and a deflection temperature under load of 50° C. or higher and are excellent in all of flame retardance, impact resistance, and heat resistance.

Example 8

Injection molded articles were obtained in the same manner as that in Example 6 except that in Example 6, an aliphatic polyester "Bionole 1003" (polybutylene succinate, heat of crystal melting (ΔHm)=40 J/g) manufactured by Showa High polymer Co., Ltd. was used in place of the aromatic-aliphatic polyester "Ecoflex". That is, a ratio of the contents of "Nature Works 6000D", "Bionole 1003", and "BW103ST" was 100:20:40 by mass.

The injection molded articles thus obtained were evaluated in the same manner as that in Example 6. Table 3 shows the results obtained. In Table 3, the data obtained in Example 6 were reentered for comparison.

TABLE 3

| | Composition (mass part) | Example 6 | Example 8 |
|---|---|---|---|
| Resin | Nature Works 6000D | 100 | 100 |
| | Ecoflex (ΔHm = 20 J/g) | 20 | |
| | Bionole 1003 (ΔHm = 40 J/g) | | 20 |
| Inorganic Filler | SG-95 | | |
| Metal hydroxide | Pyrolyzer HG (Stearic acid, silane coupling agent, nitrate-treated; w-$Na_2O$ = 0.05) | | |
| | BW103ST (Silane coupling agent-treated; w-$Na_2O$ = 0.05) | 40 | 40 |
| | Kisuma 5A (Higher fatty acid-treated; w-$Na_2O$ = 0.001) | | |
| | B103 (No treatment, w-$Na_2O$ = 0.2) | | |
| | H-43S (Stearic acid-treatment, w-$Na_2O$ = 0.13) | | |
| Evaluation | Flame retardance (UL94) | ○ | ○ |
| | Izod impact strength (kJ/m$^2$) | 15 | 9 |

Table 2 indicates that the injection molded articles of Examples 6 and 7 in which an aromatic-aliphatic polyester was used in addition to the lactic acid based resin showed an Izod impact strength of 10 kJ/m$^2$ or more and hence had improved impact resistance as compared with Example 1 to 5 in which no aromatic-aliphatic polyester was contained. Table 3 indicates that the injection molded article of Example 8 in which an aliphatic polyester was used in place of the aromatic-aliphatic polyester showed a similar effect.

In Examples 6 and 7, also evaluation of dimension stability was performed. Table 4 shows the results obtained. In Table 4, the data obtained in Example 6 were reentered for comparison.

TABLE 4

| | Composition (mass part) | Example 6 | Example 7 |
|---|---|---|---|
| Resin | Nature Works 6000D | 100 | 100 |
| | Ecoflex (ΔHm = 20 J/g) | 20 | 20 |
| | Bionole 1003 (ΔHm = 40 J/g) | | |

TABLE 4-continued

| | Composition (mass part) | Example 6 | Example 7 |
|---|---|---|---|
| Inorganic Filler | SG-95 | | 10 |
| Metal hydroxide | Pyrolyzer HG (Stearic acid, silane coupling agent, nitrate-treated; w-$Na_2O$ = 0.05) | | |
| | BW103ST (Silane coupling agent-treated; w-$Na_2O$ = 0.05) | 40 | 40 |
| | Kisuma 5A (Higher fatty acid-treated; w-$Na_2O$ = 0.001) | | |
| | B103 (No treatment, w-$Na_2O$ = 0.2) | | |
| | H-43S (Stearic acid-treatment, w-$Na_2O$ = 0.13) | | |
| Evaluation | Dimension Stability | Δ | ○ |

As will be apparent from Table 4, the injection molded article of Example 7 that contained inorganic filler showed very excellent dimension stability. That is, it was confirmed that inclusion of the inorganic filler improved dimension stability.

COMPARATIVE EXAMPLE 1

Injection molded articles were prepared in the same manner as that in Example 2 except that in Example 2, no metal hydroxide was blended.

The obtained injection molded articles were evaluated in the same manner as that in Example 1. Table 5 shows the results obtained. In Table 5, the data obtained in Examples 2 to 4 were reentered for comparison.

COMPARATIVE EXAMPLE 2

Injection molded articles were prepared in the same manner as that in Example 2 except that in Example 2, the content of the metal hydroxide was changed to 3 mass parts per 100 mass parts of the lactic acid based resin. That is, a ratio of the contents of "Nature Works 6000D" and "BW103ST" was 100:3 by mass.

The injection molded articles thus obtained were evaluated in the same manner as that in Example 1. Table 5 shows the results obtained.

COMPARATIVE EXAMPLE 3

Injection molded articles were prepared in the same manner as that in Example 2 except that in Example 2, the content of the metal hydroxide was changed to 50 mass parts per 100 mass parts of the lactic acid based resin. That is, a ratio of the contents of "Nature Works 6000D" and "BW103ST" was 100:50 by mass.

The injection molded articles thus obtained were evaluated in the same manner as that in Example 1. Table 5 shows the results obtained.

TABLE 5

| | Composition (mass part) | Example 2 | Example 3 | Example 4 | Comparative Example 1 | Comparative Example 2 | Comparative Example 3 |
|---|---|---|---|---|---|---|---|
| Resin | Nature Works 6000D | 100 | 100 | 100 | 100 | 100 | 100 |
| | Ecoflex (ΔHm = 20 J/g) | | | | | | |
| | Bionole 1003 (ΔHm = 40 J/g) | | | | | | |
| Inorganic filler | SG-95 | | | | | | |
| Metal hydro- | Pyrolyzer HG (Stearic acid, silane coupling | | | | | | |

TABLE 5-continued

| Composition (mass part) | | | Example 2 | Example 3 | Example 4 | Comparative Example 1 | Comparative Example 2 | Comparative Example 3 |
|---|---|---|---|---|---|---|---|---|
| | Xide | agent, nitrate-treated; w-$Na_2O$ = 0.05) | | | | | | |
| | | BW103ST (Silane coupling agent-treated; w-$Na_2O$ = 0.05) | 10 | 25 | 40 | | 3 | 50 |
| | | Kisuma 5A (Higher fatty acid-treated; w-$Na_2O$ = 0.001) | | | | | | |
| | | B103 (No treatment, w-$Na_2O$ = 0.2) | | | | | | |
| | | H-43S (Stearic acid-treatment, w-$Na_2O$ = 0.13) | | | | | | |
| Evaluation | Flame retardance (UL94) | | ○ | ○ | ○ | X | X | ○ |
| | Izod impact strength (kJ/m$^2$) | | 8 | 6 | 6 | 8 | 7 | 4 |

As will be apparent from Table 5, the injection molded articles of Comparative example 1 in which no metal hydroxide was blended and in Comparative Example 2 in which the content of the metal hydroxide was less than 5 mass parts per 100 mass parts of the lactic acid based resin showed "X" for the evaluation of flame retardance. This indicates that these injection molded articles had poor flame retardance. In Comparative Example 3 in which the content of the metal hydroxide was more than 40 mass parts per 100 mass parts of the lactic acid based resin, the injection molded articles had an Izod impact strength of 5 kJ/m$^2$ or less, which indicates that they had poor impact resistance.

COMPARATIVE EXAMPLE 4

Injection molded articles were obtained in the same manner as that in Example 1 except that in Example 1, "B103" (nontreated aluminum hydroxide that was not surface-treated, w-$Na_2O$=0.2) manufactured by Nippon Light Metal Co., Ltd. was used as the metal hydroxide, and "Nature Works 6000D" and "B103" were dry-blended in a ratio of the contents of "Nature Works 6000D" to "B103" of 100:25 by mass. The injection molded articles thus obtained were evaluated in the same manner as that in Example 1. Table 6 shows the results obtained. In Table 6, the data obtained in Examples 1, 3 and 5 were reentered for comparison.

COMPARATIVE EXAMPLE 5

Injection molded articles were obtained in the same manner as that in Example 1 except that in Example 1, "H-43S" (aluminum hydroxide surface-treated with stearic acid, w-$Na_2O$=0.13) manufactured by Showa Denko K. K. was used as the metal hydroxide, and "Nature Works 6000D" and "H-43S" were dry-blended in a ratio of the contents of "Nature Works 6000D" to "H-43S" of 100:25 by mass. The injection molded articles thus obtained were evaluated in the same manner as that in Example 1. Table 6 shows the results obtained.

TABLE 6

| | Composition (mass part) | Example 1 | Example 3 | Example 5 | Comparative Example 4 | Comparative Example 5 |
|---|---|---|---|---|---|---|
| Resin | Nature Works 6000D | 100 | 100 | 100 | 100 | 100 |
| | Ecoflex (ΔHm = 20 J/g) | | | | | |
| | Bionole 1003 (ΔHm = 40 J/g) | | | | | |
| Inorganic filler | SG-95 | | | | | |
| Metal hydroxide | Pyrolyzer HG (Stearic acid, silane coupling agent, nitrate-treated; w-$Na_2O$ = 0.05) | 25 | | | | |
| | BW103ST (Silane coupling agent-treated; w-$Na_2O$ = 0.05) | | 25 | | | |
| | Kisuma 5A (Higher fatty acid-treated; w-$Na_2O$ = 0.001) | | | 25 | | |
| | B103 (No treatment, w-$Na_2O$ = 0.2) | | | | 25 | |
| | H-43S (Stearic acid-treatment, w-$Na_2O$ = 0.13) | | | | | 25 |
| Evaluation | Flame retardance (UL94) | ○ | ○ | ○ | ○ | Δ |
| | Degradation ratio (%) | 2 | 3 | 6 | 15 | 14 |
| | Izod impact strength (kJ/m$^2$) | 7 | 6 | 6 | 4 | 4 |

As will be apparent from Table 6, the injection molded articles of Comparative Examples 4 and 5 containing the metal hydroxide with a w-$Na_2O$ content of 0.1 mass % or more showed a degradation rate of lactic acid based resin of 10% or more, which led to a decrease in mechanical strength.

INDUSTRIAL APPLICABILITY

The present invention is applicable to injection molded articles having biodegradability and flame retardance.

The invention claimed is:

1. An injection molded object comprising:
   a lactic acid based resin;
   a polyester present in a ratio of 20 to 80 mass parts per 100 mass parts of the lactic acid based resin wherein the polyester is either an aromatic-aliphatic polyester or an aliphatic polyester other than the lactic acid based resin and
   a metal hydroxide in a ratio of 10 to 40 mass parts per 100 mass parts of the lactic acid based resin,
   wherein the metal hydroxide is surface-treated, and $Na_2O$ (w-$Na_2O$) present on a surface of grains of the metal hydroxide is 0.1 mass % or less, but more than 0% based on the total mass of the metal hydroxide.

2. The injection molded object according to claim 1, wherein the composition comprises an aliphatic polyester and a heat of crystal melting of the aliphatic polyester other than the lactic acid based resin is less than 30 J/g.

3. The injection molded object according to claim 1, further comprising an inorganic filler in a ratio of 1 to 20 mass parts per 100 mass parts of the lactic acid based resin.

4. The injection molded object according to claim 1, wherein the metal hydroxide is surface-treated by at least one coating selected from the group consisting of a higher fatty acid, a silane coupling agent, a titanate coupling agent, nitrate, sol-gel, silicone polymer, and resin.

5. The injection molded object according to claim 1, wherein the injection molded object has a degradation rate of 10% or less and an impact resistance of 5 kJ/m$^2$ or more.

6. The injection molded object according to claim 1, wherein the composition comprises an aromatic-aliphatic polyester and a heat of crystal melting of the aromatic-aliphatic polyester is less than 30 J/g.

7. The injection molded object according to claim 1, wherein the metal hydroxide is selected from the group consisting of aluminum hydroxide, magnesium hydroxide, calcium aluminate hydrate, tin oxide hydrate, phlogopite, zinc nitrate hexahydrate and nickel nitrate hexahydrate.

8. The injection molded object according to claim 1, further comprising a flame retardant aid.

9. The injection molded object according to claim 8, wherein the flame retardant aid is melamine cyanurate, zinc nitrate, nickel nitrate or zinc borate.

10. The injection molded object according to claim 1, wherein the lactic acid based resin is a poly(L-lactic acid), a poly(D-lactic acid), a poly(DL-lactic acid) or a mixture thereof.

11. The injection molded object according to claim 10, wherein the lactic acid based resin is a poly(DL-lactic acid) and a compositional ratio of the D-form to the L-form of the lactic acid based resin is from 100:0 to 90:10 or from 0:100 to 10:90.

12. The injection molded object according to claim 1, wherein a weight average molecular weight of the lactic acid based resin is from 50,000 to 400,000.

13. The injection molded object according to claim 6, wherein the aromatic-aliphatic polyester is a copolymer of polybutylene adipate and terephthalate or a copolymer of tetramethylene adipate and terephthalate.

14. The injection molded object according to claim 1, further comprising an inorganic filler.

15. The injection molded object according to claim 14, wherein the inorganic filler is at least one selected from the group consisting of talc, kaolin, calcium carbonate, bentonite, mica, sericite, glass flake, graphite, antimony trioxide, barium sulfate, zinc borate, hydrated calcium borate, iron nitrate, copper nitrate, zinc nitrate, nickel nitrate, alumina, magnesia, wollastonite, xonotolite, sepiolite, glass fiber, metal powder, beads, silica balloon, and volcanic sand.

16. The injection molded object according to claim 15, wherein the a surface of the inorganic filler is treated with a titanic acid, a fatty acid or a silane coupling agent.

17. The injection molded object according to claim 1, further comprising a carbodiimide compound.

18. The injection molded object according to claim 17, wherein the carbodiimide compound is at least one selected from the group consisting of bis(propylphenyl)carbodiimide, poly(4,4'-diphenylmethanecarbodiimide), poly(p-phenylenecarbodiimide), poly(m-phenylenecarbodiimide), poly(tolylcarbodiimide), poly(diisopropylphenylenecarbodiimide), poly(methyl-diisopropylphenylenecarbodiimide), and poly(triisopropylphenylenecarbodiimide).

19. The injection molded object according to claim 17, wherein a content of the carbodiimide compound is from 0.5 to 10 mass parts per 100 mass parts of the resin composition of the injection molded object.

* * * * *